US011996028B2

(12) United States Patent
Liu

(10) Patent No.: US 11,996,028 B2
(45) Date of Patent: May 28, 2024

(54) PIXEL CIRCUIT AND DISPLAY PANEL

(71) Applicant: TCL CHINA STAR OPTOELECTRONICS TECHNOLOGY CO., LTD., Guangdong (CN)

(72) Inventor: Linfeng Liu, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 17/597,948

(22) PCT Filed: Jan. 10, 2022

(86) PCT No.: PCT/CN2022/070922
§ 371 (c)(1),
(2) Date: Jul. 6, 2023

(87) PCT Pub. No.: WO2023/123544
PCT Pub. Date: Jul. 6, 2023

(65) Prior Publication Data

US 2024/0038128 A1 Feb. 1, 2024

(30) Foreign Application Priority Data

Dec. 28, 2021 (CN) ......................... 202111624522.5

(51) Int. Cl.
*G09G 3/20* (2006.01)
*G09G 3/32* (2016.01)
*G09G 3/3225* (2016.01)

(52) U.S. Cl.
CPC ......... *G09G 3/2081* (2013.01); *G09G 3/2011* (2013.01); *G09G 3/2022* (2013.01);
(Continued)

(58) Field of Classification Search
CPC .. G09G 3/2081; G09G 3/2011; G09G 3/2022; G09G 3/32; G09G 3/3225;
(Continued)

(56) References Cited

U.S. PATENT DOCUMENTS

2011/0122110 A1* 5/2011 Abe ......................... G09G 3/22
345/207
2019/0304386 A1* 10/2019 Kim ......................... G09G 3/30
(Continued)

FOREIGN PATENT DOCUMENTS

CN 103150992 A 6/2013
CN 110556072 A 12/2019
(Continued)

OTHER PUBLICATIONS

Chinese Office Action issued in corresponding Chinese Patent Application No. 202111624522.5 dated Sep. 27, 2023, pp. 1-5.
(Continued)

*Primary Examiner* — Andrew Sasinowski
(74) *Attorney, Agent, or Firm* — PV IP PC; Wei Te Chung; Zhigang Ma

(57) ABSTRACT

A pixel circuit and a display panel are provided in the present application. The pixel circuit includes a driving module, a pulse amplitude modulation module, a pulse width modulation module, an internal compensation module, and an electrical potential maintaining module. High grayscale display is controlled by the pulse amplitude modulation module in a pulse amplitude modulation manner, low grayscale display is controlled by the pulse width modulation module in a pulse width modulation manner, and the internal compensation module performs internal compensation on a first terminal of the driving module, to realize an internal compensation and hybrid driving of the pixel circuit.

20 Claims, 2 Drawing Sheets

(52) U.S. Cl.
CPC ............. *G09G 3/32* (2013.01); *G09G 3/3225* (2013.01); *G09G 2300/0852* (2013.01); *G09G 2310/0262* (2013.01); *G09G 2310/027* (2013.01); *G09G 2310/08* (2013.01)

(58) Field of Classification Search
CPC ... G09G 2300/0852; G09G 2310/0262; G09G 2310/027; G09G 2310/08
See application file for complete search history.

(56) References Cited

U.S. PATENT DOCUMENTS

| | | | | |
|---|---|---|---|---|
| 2023/0124542 A1* | 4/2023 | Hwang | .................... | G09G 3/32<br>345/204 |
| 2023/0268474 A1* | 8/2023 | Jeong | .................. | H01L 25/0753<br>257/79 |

FOREIGN PATENT DOCUMENTS

| | | | |
|---|---|---|---|
| CN | 110634433 | A | 12/2019 |
| CN | 111341252 | A | 6/2020 |
| CN | 111402794 | A | 7/2020 |
| CN | 111681598 | A | 9/2020 |
| CN | 112102772 | A | 12/2020 |
| CN | 113396452 | A | 9/2021 |
| CN | 113487994 | A | 10/2021 |
| WO | 2019237735 | A1 | 12/2019 |
| WO | 2021210893 | A1 | 10/2021 |

OTHER PUBLICATIONS

International Search Report in International application No. PCT/CN2022/070922, dated Oct. 10, 2022.
Written Opinion of the International Search Authority in International application No. PCT/CN2022/070922, dated Oct. 10, 2022.

* cited by examiner

PIXEL CIRCUIT AND DISPLAY PANEL

FIELD OF INVENTION

The present application relates to the field of display technology, and in particular, to a pixel circuit and a display panel.

BACKGROUND OF INVENTION

The driving methods of pixel circuits can be divided into pulse amplitude modulation (PAM) driving method, pulse width modulation (PWM) driving method and hybrid driving method. The hybrid driving method is a combination of the pulse amplitude modulation driving method and the pulse width modulation driving method, which can solve a problem of poor quality of low grayscale display such as brightness dispersion, color point drift, etc. Pixel circuits can be divided into internal compensation pixel circuits and external compensation pixel circuits according to different compensation methods. The external compensation pixel circuit needs to rely on an external circuit to complete the compensation function. Compared with the internal compensation pixel circuit, the production cost of the external compensation pixel circuit is higher.

Therefore, it is necessary to propose a pixel circuit with both an internal compensation and a hybrid driving method to achieve high display quality by less cost.

It should be noted that the above description of the background technology is only for facilitating a clear and complete understanding of the technical solutions of the present application. Therefore, it should not be considered that the above-mentioned technical solutions are known to those skilled in the art just because they appear in the background art of the present application.

The present application provides a pixel circuit and a display panel to realize an internal compensation and hybrid driving of the pixel circuit.

SUMMARY OF INVENTION

In a first aspect, the present application provides a pixel circuit, including a driving module; a pulse amplitude modulation module, wherein an output terminal of the pulse amplitude modulation module is electrically connected with a control terminal of the driving module; a pulse width modulation module, wherein an output terminal of the pulse width modulation module is electrically connected with the control terminal of the driving module; an internal compensation module, wherein an output terminal of the internal compensation module is electrically connected to a first terminal of the driving module; and an electrical potential maintaining module, wherein a first terminal of the electrical potential maintaining module is electrically connected with the first terminal of the driving module.

In some of the embodiments, the pixel circuit further including a light-emitting control module, wherein a first terminal of the light-emitting control module is electrically connected to a second terminal of the electrical potential maintaining module and receives a positive power supply signal, and wherein a second terminal of the light-emitting control module is electrically connected to a second terminal of the driving module, and wherein a control terminal of the light-emitting control module receives a first control signal; a storage module, wherein a first terminal of the storage module is electrically connected to the control terminal of the driving module, and wherein a second terminal of the storage module is electrically connected to the first terminal of the driving module; and a light-emitting device, wherein an anode of the light-emitting device is electrically connected to the first terminal of the driving module, and wherein a cathode of the light-emitting device receives a negative power supply signal.

In some embodiments, the driving module includes a driving transistor, wherein a gate electrode of the driving transistor is electrically connected to the output terminal of the pulse amplitude modulation module, the output terminal of the width modulation module, and the first terminal of the storage module, and wherein one of a source electrode and a drain electrode of the driving transistor is electrically connected to the output terminal of the internal compensation module and the first terminal of the potential maintaining module, and wherein another one of the source electrode and the drain electrode of the driving transistor is electrically connected to the second terminal of the light-emitting control module; and wherein the control terminal of the driving module is the gate electrode of the driving transistor, and wherein the first terminal of the driving module is one of the source electrode and the drain electrode of the driving transistor, and wherein the second terminal of the driving module is another one of the source electrode and the drain electrode of the driving transistor.

In some embodiments, the pulse amplitude modulation module includes a pulse amplitude control transistor, and wherein one of a source electrode and a drain electrode of the pulse amplitude control transistor receives a pulse amplitude data signal, and wherein a gate electrode of the pulse amplitude control transistor receives the second control signal, and wherein another one of the source electrode and the drain electrode of the pulse amplitude control transistor is electrically connected to the gate electrode of the driving transistor; and wherein the output terminal of the pulse amplitude modulation module is another one of the source electrode and the drain electrode of the pulse amplitude control transistor.

In some embodiments, the pulse width modulation module includes a pulse width control transistor, and wherein one of the source electrode and the drain electrode of the pulse width control transistor receives a pulse width data signal, and wherein a gate electrode of the pulse width control transistor receives the third control signal, and wherein another one of the source electrode and the drain electrode of the pulse width control transistor is electrically connected to the gate electrode of the driving transistor; and wherein the output terminal of the pulse width modulation module is the another one of the source electrode and the drain electrode of the pulse width control transistor.

In some embodiments, the internal compensation module includes a compensation transistor, and wherein one of a source electrode and a drain electrode of the compensation transistor receives the reset signal, and wherein a gate electrode of the compensation transistor receives a fourth control signal, and wherein another one of the source electrode and the drain electrode of the compensation transistor is electrically connected to one of the source electrode and the drain electrode of the driving transistor; wherein the output terminal of the internal compensation module is another one of the source electrode and the drain electrode of the compensation transistor.

In some of the embodiments, the electrical potential maintaining module includes a first capacitor, and wherein a first terminal of the first capacitor is electrically connected to one of the source electrode and the drain electrode of the driving transistor, and wherein a second terminal of the first capacitor is electrically connected to the first terminal of the light-emitting control module and receives the positive power supply signal.

In some of these embodiments, one frame time of the pixel circuit includes a writing phase and a light-emitting phase, and wherein in the writing phase, the internal compensation module resets an electrical potential of the first terminal of the driving module, and then the pulse width modulation module writes a pulse width data signal to the control terminal of the driving module; and wherein in the light-emitting stage, the pulse width modulation module writes a pulse width data signal to the control terminal of the driving module to intermittently turn off the driving module.

In some of the embodiments, during a conduction period of the pulse amplitude modulation module, the internal compensation module resets an electrical potential of the first terminal of the driving module when the light-emitting control module is in a conduction state, and wherein the pulse amplitude modulation module outputs a pulse amplitude data signal with pulses to the control terminal of the driving module when the light-emitting control module is in an off state, and the reset time of the first terminal of the driving module is earlier than a pulse start time of the pulse amplitude data signal in one frame time; and during an off period of the pulse amplitude modulation module and the light-emitting control module in an on state, the pulse width modulation module outputs a pulse width data signal with at least one pulse to the control terminal of the driving module, to control the light-emitting time of the light-emitting device in low grayscale display.

In a second aspect, the present application provides a display panel including the pixel circuit in at least one of the above embodiments.

In the pixel circuit and the display panel provided by the present application, the pulse amplitude modulation module can control a high grayscale display in a pulse width modulation mode, and the pulse width modulation module can control a low grayscale display in a pulse width modulation mode, thus, a high display quality of a hybrid driving method is realized. An internal compensation module can internally compensate a first terminal of a driving module to reduce a cost of compensation, to realize the internal compensation and hybrid driving of the pixel circuit, and then achieve high display quality by less cost. In addition, an electrical potential maintaining module can maintain a compensated electrical potential of the first terminal of the driving module, and can stabilize a voltage difference between a control terminal of the driving module and the first terminal of the driving module, thereby improving a control precision of a display time.

DETAILED DESCRIPTION OF EMBODIMENTS

In order to make the objectives, technical solutions and effects of the present application clearer and more specific, the present application will be further described in detail below with reference to the accompanying figures and examples. It should be understood that the specific embodiments described herein are only used to explain the present application, but not to limit the present application.

Figure 1:
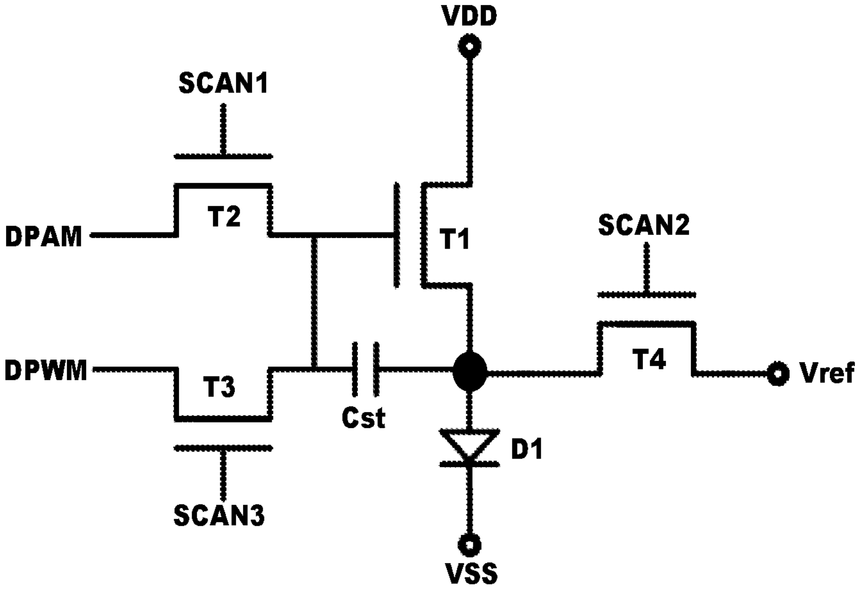
FIG. 1 is a schematic diagram of a first structure of a pixel circuit provided by one embodiment of the present application.

This embodiment provides a pixel circuit. As shown in FIG. 1, the pixel circuit includes a driving transistor T1, a switching transistor T2, a switching transistor T3, a switching transistor T4, a storage capacitor Cst, and a light-emitting device D1. One of a source electrode and a drain electrode of the driving transistor T1 receives a positive power supply signal VDD, another one of the source electrode and the drain electrode of the driving transistor T1 is electrically connected to an anode of the light-emitting device D1, and a cathode of the light-emitting device D1 receives a negative power supply signal VSS. One of a source electrode and a drain electrode of the switching transistor T4 receives a reference signal Vref or an electrical potential of another one of the source electrode and the drain electrode of the driving transistor T1. A gate electrode of the switching transistor T4 receives a control signal SCAN2, and another one of the source electrode and the drain electrode of the switching transistor T4 is electrically connected to the another one of the source electrode and the drain electrode of the driving transistor T1. Another one of the source electrode and the drain electrode of the switching transistor T2 receives a pulse amplitude data signal DPAM, and a gate electrode of the switching transistor T3 receives a control signal SCAN1. The another one of the source electrode and the drain electrode of the switching transistor T2 is electrically connected to the gate electrode of the driving transistor T1. One of a source electrode and a drain electrode of the switching transistor T3 receives the pulse width data signal DPWM. A gate electrode of the switching transistor T3 receives the control signal SCAN3. Another one of the source electrode and the drain electrode of the switching transistor T3 is electrically connected to the gate electrode of the driving transistor T1. One terminal of the storage capacitor Cst is electrically connected to the gate electrode of the driving transistor T1, another terminal of the storage capacitor Cst is electrically connected to the another one of the source electrode and the drain electrode of the driving transistor T1.

Under a control of the control signal SCAN3, the switching transistor T3 can control the pulse width data signal DPWM to be written to the gate electrode of the driving transistor T1, to control the low grayscale display of the pixel circuit. Under a control of the control signal SCAN1, the switching transistor T2 can control the pulse amplitude data signal DPAM to be written to the gate electrode of the driving transistor T1, to control the high grayscale display of the pixel circuit. Under a control of the control signal SCAN2, the switching transistor T4 can control the reference signal Vref to be written to the another one of the source electrode and the drain electrode of the driving transistor T1 to initialize the electrical potential of the another one of the source electrode and the drain electrode of the driving transistor T1 and/or the anode potential of the light-emitting device D1. The switching transistor T4 can also output the electrical potential of the another one of the source electrode and the drain electrode of the driving transistor T1 to an external compensation system, so that the external compensation system can compensate the pulse amplitude data signal DPAM and/or the pulse width data signal DPWM according to the electrical potential of the another one of the source electrode and the drain electrode of the driving transistor T1.

Based on the above analysis, the pixel circuit in this embodiment needs to be compensated for the pixel circuit by an external compensation system. However, it is obviously that there is an added cost to configure the external compensation system.

Figure 2:
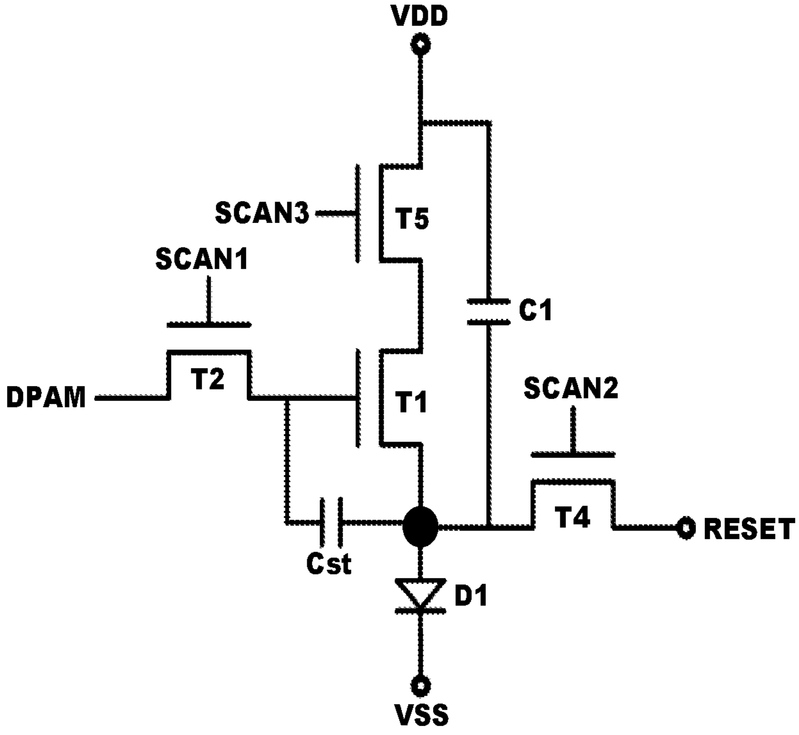
FIG. 2 is a schematic diagram of a second structure of the pixel circuit according to one embodiment of the present application.

In view of the problem that the configuration of the external compensation system needs to increase the cost, this embodiment provides another pixel circuit, as shown in FIG. 2, the pixel circuit includes a driving transistor T1, a switching transistor T2, a switching transistor T4, a switching transistor T5, a storage capacitor Cst, a light-emitting device D1 and a first capacitor C1. One of a source electrode and a drain electrode of the switching transistor T5 receives a positive power supply signal VDD, a gate electrode of the switching transistor T5 receives a control signal SCAN3. Another one of the source electrode and the drain electrode of the switching transistor T5 receives the control signal SCAN3. The another one of the source electrode and the drain electrode of the switching transistor T5 is electrically connected to one of the source electrode and the drain electrode of the driving transistor T1. The another one of the source electrode and the drain electrode of the driving transistor T1 is electrically connected to an anode of a light-emitting device D1. A cathode of the light-emitting device D1 receives a negative power supply signal VSS. One of a source electrode and a drain electrode of the switching transistor T4 receives the reset signal RESET. A gate electrode of the switching transistor T4 receives a control signal SCAN2, and another of the source electrode and the drain electrode of the switching transistor T4 is electrically connected to the another one of the source electrode and the drain electrode of the driving transistor T1. One of the source electrode and the drain electrode of the switching transistor T2 receives the pulse amplitude data signal DPAM, and the gate electrode of the switching transistor T2 receives the control signal SCAN1. The another one of the source electrode and the drain electrode of the switching transistor T2 is electrically connected to the gate electrode of the driving transistor T1. One terminal of the storage capacitor Cst is electrically connected to the gate electrode of the driving transistor T1. Another terminal of the storage capacitor Cst is electrically connected to the another one of the source electrode and the drain electrode T1. One terminal of the first capacitor C1 is electrically connected to the another one of the source electrode and the drain electrode of the driving transistor T1. The another terminal of the first capacitor C1 is electrically connected to one of the source electrode and the drain electrode of the switching transistor T5 to maintain an electrical potential of the another one of the source electrode and the drain electrode of the driving transistor T1.

Under the control of the control signal SCAN1, the switching transistor T2 can control the pulse amplitude data signal DPAM to be written to the gate electrode of the driving transistor T1, to control the display of each gray scale of the pixel circuit. Under the control of the control signal SCAN2, the switching transistor T4 can control the reset signal RESET to be written to the another one of the source electrode and the drain electrode of the driving transistor T1 to initialize the electrical potential of the another one of the source electrode and the drain electrode of the driving transistor T1 and/or an electrical potential of the anode of the light emitting device D1.

Based on the above analysis, although the pixel circuit in this embodiment achieves internal compensation through the switching transistor T4, under the control of the control signal SCAN1, the switching transistor T2 can control the pulse amplitude data signal DPAM to be written to the gate electrode of the driving transistor T1, which only can realize the pulse amplitude modulation driving mode, but the pulse width modulation driving mode cannot be realized, and the display quality of low grayscale cannot be controlled.

Figure 3:
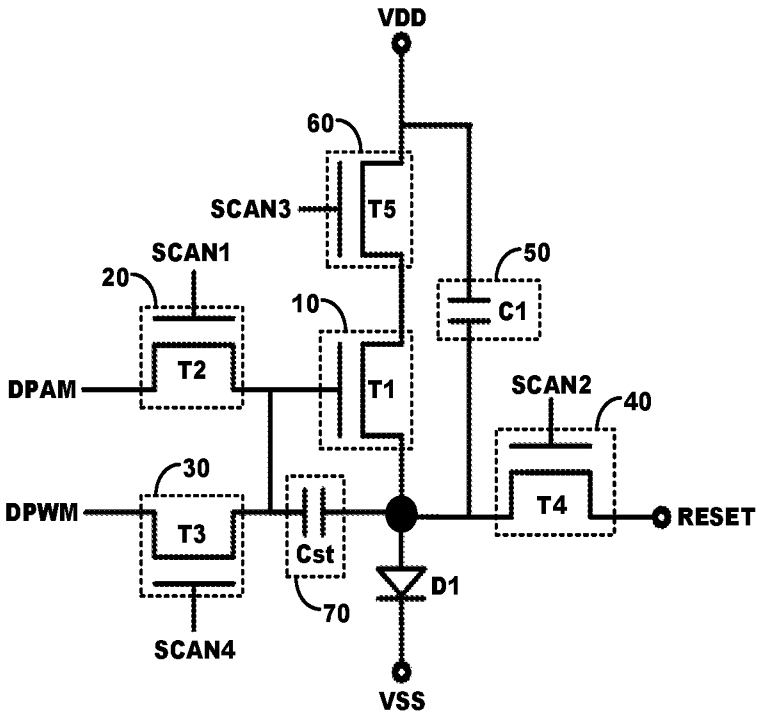
FIG. 3 is a schematic diagram of a third structure of the pixel circuit according to one embodiment of the present application.

In a process of continuous research and development of pixel circuits, a structure of pixel circuits has been constantly changing. However, there has been a lack of a pixel circuit with both internal compensation and hybrid driving methods, which can achieve high display quality by less cost. In view of this, this embodiment provides another pixel circuit. As shown in FIG. 3, the pixel circuit includes a driving module 10, a pulse amplitude modulation module 20, a pulse width modulation module 30, an internal compensation module 40, and an electrical potential maintaining module 50. An output terminal of the pulse amplitude modulation module 20 is electrically connected with a control terminal of the driving module 10. An output terminal of the pulse width modulation module 30 is electrically connected with the control terminal of the driving module 10. An output terminal of the internal compensation module 40 is electrically connected to a first terminal of the driving module 10. A first terminal of the electrical potential maintaining module 50 is electrically connected to the first terminal of the driving module 10.

In the pixel circuit provided by the present application, the pulse amplitude modulation module 20 can control a high grayscale display in a pulse width modulation mode, and the pulse width modulation module 30 can control a low grayscale display in a pulse width modulation mode, thus, a high display quality of a hybrid driving method is realized. An internal compensation module 40 can internally compensate a first terminal of a driving module 10 to reduce a cost of compensation, to realize the internal compensation and hybrid driving of the pixel circuit, and then achieve high display quality by less cost. In addition, an electrical potential maintaining module 50 can maintain a compensated electrical potential of the first terminal of the driving module 10, and can stabilize a voltage difference between a control terminal of the driving module 10 and the first terminal of the driving module 10, thereby improving a control precision of a display time.

In one embodiment, the pixel circuit further includes a light-emitting control module 60, a storage module 70, and a light-emitting device D1. A first terminal of the light-emitting control module 60 is electrically connected to a second terminal of the electrical potential maintaining module 50 and receives a positive power supply signal VDD. A second terminal of the light-emitting control module 60 is electrically connected to a second terminal of the driving module 10. A control terminal of the light-emitting control module 60 receives a first control signal SCAN3. A first terminal of the storage module 70 is electrically connected to the control terminal of the driving module 10. A second terminal of the storage module 70 is electrically connected to the first terminal of the driving module 10. An anode of the light-emitting device D1 is electrically connected to the first terminal of the driving module 10. A cathode of the light-emitting device D1 receives a negative power supply signal VSS.

In one embodiment, the light-emitting control module 60 includes a light-emitting control transistor T5. One of a source electrode and a drain electrode of the light-emitting control transistor T5 receives the power supply positive signal VDD. Another one of the source electrode and the drain electrode of the light-emitting control transistor T5 is electrically connected to the another one of the source electrode and the drain electrode of the driving transistor T1. The gate electrode of the light-emitting control transistor T5 receives the first control signal SCAN3.

In one embodiment, the storage module 70 includes a storage capacitor Cst. one terminal of the storage capacitor Cst is electrically connected to the gate electrode of the driving transistor T1, and the other terminal of the storage capacitor Cst is electrically connected to one of the source electrode and the drain electrode of the driving transistor T1.

In one of the embodiments, the light emitting device D1 may be one of a mini light emitting diode, a micro light emitting diode, or an organic light emitting diode.

In one embodiment, the driving module 10 includes a driving transistor T1. A gate electrode of the driving transistor T1 is electrically connected to the output terminal of the pulse amplitude modulation module 20, the output terminal of the width modulation module 30, and the first terminal of the storage module 70. One of the source electrode and the drain electrode of the driving transistor T1 is electrically connected to the output terminal of the internal compensation module and the first terminal of the potential maintaining module. Another one of the source electrode and the drain electrode of the driving transistor T1 is electrically connected to the second terminal of the light-emitting control module 60. The control terminal of the driving module 10 is the gate electrode of the driving transistor T1. The first terminal of the driving module 10 is one of the source electrode and the drain electrode of the driving transistor T1, and wherein the second terminal of the driving module 10 is another one of the source electrode and the drain electrode of the driving transistor T1.

In one embodiment, the pulse amplitude modulation module 20 includes a pulse amplitude control transistor T2. One of a source electrode and a drain electrode of the pulse amplitude control transistor T2 receives a pulse amplitude data signal DPAM. A gate electrode of the pulse amplitude control transistor T2 receives the second control signal SCAN1. Another one of the source electrode and the drain electrode of the pulse amplitude control transistor T2 is electrically connected to the gate electrode of the driving transistor T1. The output terminal of the pulse amplitude modulation module 20 is another one of the source electrode and the drain electrode of the pulse amplitude control transistor T2.

In one embodiment, the pulse width modulation module 30 includes a pulse width control transistor T3, and wherein one of the source electrode and the drain electrode of the pulse width control transistor T3 receives a pulse width data signal DPWM, and wherein a gate electrode of the pulse width control transistor T3 receives the third control signal SCAN4, and wherein another one of the source electrode and the drain electrode of the pulse width control transistor T3 is electrically connected to the gate electrode of the driving transistor T1. The output terminal of the pulse width modulation module 30 is the another one of the source electrode and the drain electrode of the pulse width control transistor T3.

In one embodiment, the internal compensation module 40 includes a compensation transistor T4. One of a source electrode and a drain electrode of the compensation transistor T4 receives the reset signal RESET. A gate electrode of the compensation transistor T4 receives a fourth control signal SCAN2. Another one of the source electrode and the drain electrode of the compensation transistor T4 is electrically connected to one of the source electrode and the drain electrode of the driving transistor T1. The output terminal of the internal compensation module 40 is another one of the source electrode and the drain electrode of the compensation transistor T4.

In one embodiment, the electrical potential maintaining module 50 includes a first capacitor C1, and wherein a first terminal of the first capacitor C1 is electrically connected to one of the source electrode and the drain electrode of the driving transistor T1. A second terminal of the first capacitor C1 is electrically connected to the first terminal of the light-emitting control module 60 and receives the positive power supply signal VDD.

In one embodiment, the pulse width control transistor T3, the pulse width control transistor T2, the compensation transistor T4, and the light emission control transistor T5 are all N-channel thin film transistors. For example, may be N-channel metal oxide thin film transistors. The driving transistor T1 may be a P-channel thin film transistor, for example, a P-channel low-temperature polysilicon thin film transistor. It can be understood that this configuration can not only ensure a dynamic performance of the pixel circuit, but also ensure a low leakage of the pixel circuit.

Figure 4:
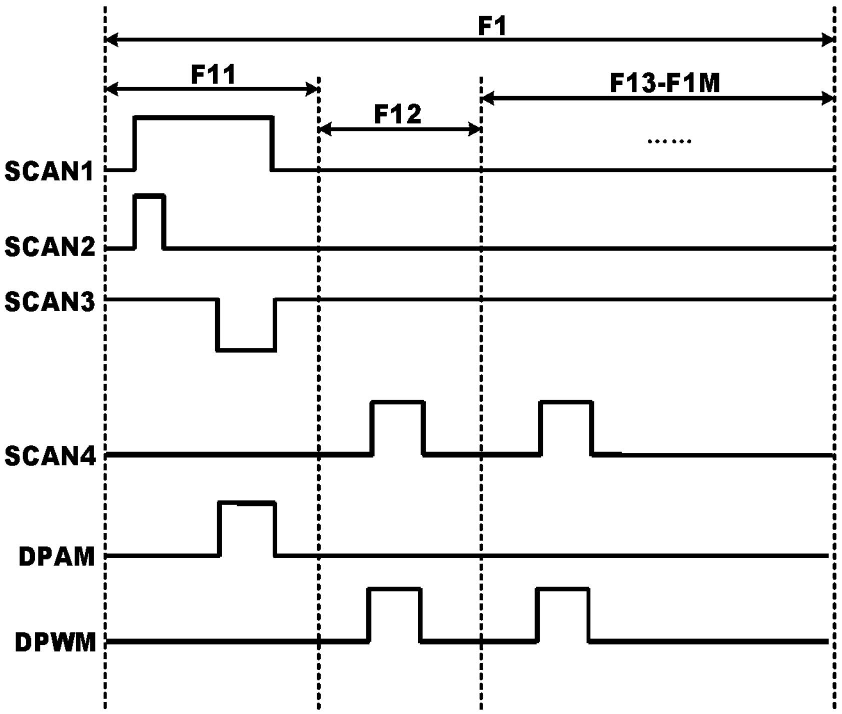
FIG. 4 is a time sequence diagram of the pixel circuit shown in FIG. 3.

In one of the embodiments, an operating process of the pixel circuit shown in FIG. 3 is specifically shown in FIG. 4, a frame F1 may include a first subframe F11 and a second subframe F12 in chronological order, or may also include a subsequent third subframe F13 to the Mth subframe F1M. M may be a positive integer greater than or equal to 3.

In the first subframe F11, the first control signal SCAN3, the second control signal SCAN1, and the fourth control signal SCAN2 are all at high electrical potentials, the pulse amplitude control transistor T2, the compensation transistor T4, and the light-emitting control transistor T5 are all turned on. The reset signal RESET compensates the electrical potential of one of the source electrode and the drain electrode of the driving transistor T1 through the compensation transistor T4, and maintains the compensated potential of one of the source electrode and the drain electrode of the driving transistor T1 through the first capacitor C1. Then, the first control signal SCAN3 is at a low electrical potential, the light-emitting control transistor T5 is turned off. The second control signal SCAN1 is still at a high electrical potential, the pulse amplitude control transistor T2 is kept on, and a pulse of the pulse amplitude data signal DPAM is written into the gate electrode of the driving transistor T1 through the pulse amplitude control transistor T2. That is to say, the first sub-frame F11 is used for compensating and driving the high grayscale display of the pixel circuit through pulse amplitude modulation.

In the second subframe F12, the second control signal SCAN1 and the fourth control signal SCAN2 are both at a low electrical potential, and the pulse amplitude control transistor T2 and the compensation transistor T4 are both turned off. The first control signal SCAN3 is at a high electrical potential, and the light-emitting control transistor T5 remains turned on. The turned on pulse width control transistor T3 outputs the pulse width data signal DPWM at a high electrical potential to the gate electrode of the driving transistor T1 when the third control signal SCAN4 is at the high electrical potential, so that the driving transistor T1 is turned off to control the low grayscale display time, thereby improving the display quality of the low grayscale.

In any one of the subsequent third subframe F13 to the Mth subframe F1M, the pulse width data signal DPWM may have at least one pulse to control the display quality of the low grayscale.

That is to say, one frame time of the pixel circuit may include at least one of the writing phase, that is, the first subframe F11, and the light-emitting phase, that is, the second subframe F12 or at least one of the second subframe F12 to the Mth subframe F1M. In the writing phase, the internal compensation module 40 first resets the electrical potential of the first terminal of the driving module 10, and then the pulse amplitude modulation module 20 writes the pulse amplitude data signal DPAM to the control terminal of the driving module 10. In the light-emitting stage, the pulse width modulation module 30 write the pulse width data signal DPWM to the control terminal of the driving module 10 to turn off the driving module 10 intermittently.

Specifically, during a conduction period of the pulse amplitude modulation module 20, the internal compensation module 40 resets an electrical potential of the first terminal of the driving module 10 when the light-emitting control module 60 is in a conduction state, and wherein the pulse amplitude modulation module 20 outputs a pulse amplitude data signal DPAM with pulses to the control terminal of the driving module 10 when the light-emitting control module 60 is in an off state, and the reset time of the first terminal of the driving module 10 is earlier than a pulse start time of the pulse amplitude data signal DPAM in one frame time; and during an off period of the pulse amplitude modulation module 20 and the light-emitting control module 60 in an on state, the pulse width modulation module 30 outputs a pulse width data signal DPWM with at least one pulse to the control terminal of the driving module 10, to control the light-emitting time of the light-emitting device D1 in low grayscale display.

In one of the embodiments, this embodiment provides a display panel including the pixel circuit in at least one of the above embodiments.

In the display panel provided in this embodiment, the pulse amplitude modulation module 20 can control a high grayscale display in a pulse width modulation mode, and the pulse width modulation module 30 can control a low grayscale display in a pulse width modulation mode, thus, a high display quality of a hybrid driving method is realized. An internal compensation module 40 can internally compensate a first terminal of a driving module 10 to reduce a cost of compensation, to realize the internal compensation and hybrid driving of the pixel circuit, and then achieve high display quality by less cost. In addition, an electrical potential maintaining module 50 can maintain a compensated electrical potential of the first terminal of the driving module 10, and can stabilize a voltage difference between a control terminal of the driving module 10 and the first terminal of the driving module 10, thereby improving a control precision of a display time.

It can be understood that for those of ordinary skill in the art, equivalent replacements or changes can be made according to the technical solutions and inventive concepts of the present application, and all these changes or replacements should belong to a protection scope of the appended claims of the present application.

What is claimed is:

1. A pixel circuit, comprising:

a driving module;

a pulse amplitude modulation module, wherein an output terminal of the pulse amplitude modulation module is electrically connected to a control terminal of the driving module;

a pulse width modulation module, wherein an output terminal of the pulse width modulation module is electrically connected to the control terminal of the driving module;

an internal compensation module, wherein an output terminal of the internal compensation module is electrically connected to a first terminal of the driving module; and an electrical potential maintaining module, wherein a first terminal of the electrical potential maintaining module is electrically connected to the first terminal of the driving module.

2. The pixel circuit according to claim 1, further comprising:

a light-emitting control module, wherein a first terminal of the light-emitting control module is electrically connected to a second terminal of the electrical potential maintaining module and receives a positive power supply signal, and wherein a second terminal of the light-emitting control module is electrically connected to a second terminal of the driving module, and wherein a control terminal of the light-emitting control module receives a first control signal;

a storage module, wherein a first terminal of the storage module is electrically connected to the control terminal of the driving module, and wherein a second terminal of the storage module is electrically connected to the first terminal of the driving module; and a light-emitting device, wherein an anode of the light-emitting device is electrically connected to the first terminal of the driving module, and wherein a cathode of the light-emitting device receives a negative power supply signal.

3. The pixel circuit according to claim 2, wherein the driving module comprises a driving transistor, wherein a gate electrode of the driving transistor is electrically connected to the output terminal of the pulse amplitude modulation module, the output terminal of the width modulation module, and the first terminal of the storage module, and wherein one of a source electrode and a drain electrode of the driving transistor is electrically connected to the output terminal of the internal compensation module and the first terminal of the potential maintaining module, and wherein another one of the source electrode and the drain electrode of the driving transistor is electrically connected to the second terminal of the light-emitting control module; and wherein the control terminal of the driving module is the gate electrode of the driving transistor, and wherein the first terminal of the driving module is one of the source electrode and the drain electrode of the driving transistor, and wherein the second terminal of the driving module is another one of the source electrode and the drain electrode of the driving transistor.

4. The pixel circuit according to claim 3, wherein the pulse amplitude modulation module comprises a pulse amplitude control transistor, and wherein one of a source electrode and a drain electrode of the pulse amplitude control transistor receives a pulse amplitude data signal, and wherein a gate electrode of the pulse amplitude control transistor receives the second control signal, and wherein another one of the source electrode and the drain electrode of the pulse amplitude control transistor is electrically connected to the gate electrode of the driving transistor; and wherein the output terminal of the pulse amplitude modulation module is another one of the source electrode and the drain electrode of the pulse amplitude control transistor.

5. The pixel circuit according to claim 4, wherein the pulse width modulation module comprises a pulse width control transistor, and wherein one of the source electrode and the drain electrode of the pulse width control transistor receives a pulse width data signal, and wherein a gate electrode of the pulse width control transistor receives the third control signal, and wherein another one of the source electrode and the drain electrode of the pulse width control transistor is electrically connected to the gate electrode of the driving transistor; and wherein the output terminal of the pulse width modulation module is the another one of the source electrode and the drain electrode of the pulse width control transistor.

6. The pixel circuit according to claim 5, wherein the internal compensation module comprises a compensation transistor, and wherein one of a source electrode and a drain electrode of the compensation transistor receives the reset signal, and wherein a gate electrode of the compensation transistor receives a fourth control signal, and wherein another one of the source electrode and the drain electrode of the compensation transistor is electrically connected to one of the source electrode and the drain electrode of the driving transistor; and wherein the output terminal of the internal compensation module is another one of the source electrode and the drain electrode of the compensation transistor.

7. The pixel circuit according to claim 6, wherein the electrical potential maintaining module comprises a first capacitor, and wherein a first terminal of the first capacitor is electrically connected to one of the source electrode and the drain electrode of the driving transistor, and wherein a second terminal of the first capacitor is electrically connected to the first terminal of the light-emitting control module and receives the positive power supply signal.

8. The pixel circuit according to claim 2, wherein during a conduction period of the pulse amplitude modulation module, the internal compensation module resets an electrical potential of the first terminal of the driving module when the light-emitting control module is in a conduction state, and wherein the pulse amplitude modulation module outputs a pulse amplitude data signal with pulses to the control terminal of the driving module when the light-emitting control module is in an off state, and the reset time of the first terminal of the driving module is earlier than a pulse start time of the pulse amplitude data signal in one frame time; and during an off period of the pulse amplitude modulation module and the light-emitting control module in an on state, the pulse width modulation module outputs a pulse width data signal with at least one pulse to the control terminal of the driving module, to control the light-emitting time of the light-emitting device in low grayscale display.

9. The pixel circuit according to claim 1, wherein one frame time of the pixel circuit comprises a writing phase and a light-emitting phase, and wherein in the writing phase, the internal compensation module resets an electrical potential of the first terminal of the driving module, and then the pulse width modulation module writes a pulse width data signal to the control terminal of the driving module; and wherein in the light-emitting stage, the pulse width modulation module writes a pulse width data signal to the control terminal of the driving module to intermittently turn off the driving module.

10. A display panel comprising the pixel circuit of claim 1.

11. The display panel according to claim 10, further comprising:

a light-emitting control module, wherein a first terminal of the light-emitting control module is electrically connected to a second terminal of the electrical potential maintaining module and receives a positive power supply signal, and wherein a second terminal of the light-emitting control module is electrically connected to a second terminal of the driving module, and wherein a control terminal of the light-emitting control module receives a first control signal;

a storage module, wherein a first terminal of the storage module is electrically connected to the control terminal of the driving module, and wherein a second terminal of the storage module is electrically connected to the first terminal of the driving module; and a light-emitting device, wherein an anode of the light-emitting device is electrically connected to the first terminal of the driving module, and wherein a cathode of the light-emitting device receives a negative power supply signal.

12. The display panel according to claim 11, wherein during a conduction period of the pulse amplitude modulation module, the internal compensation module resets an electrical potential of the first terminal of the driving module when the light-emitting control module is in a conduction state, and wherein the pulse amplitude modulation module outputs a pulse amplitude data signal with pulses to the control terminal of the driving module when the light-emitting control module is in an off state, and the reset time of the first terminal of the driving module is earlier than a pulse start time of the pulse amplitude data signal in one frame time; and during an off period of the pulse amplitude modulation module and the light-emitting control module in an on state, the pulse width modulation module outputs a pulse width data signal with at least one pulse to the control terminal of the driving module, to control the light-emitting time of the light-emitting device in low grayscale display.

13. The display panel according to claim 11, wherein the light-emitting device is one of a mini light emitting diode, a micro light emitting diode, or an organic light emitting diode.

14. The display panel according to claim 11, wherein the driving module comprises a driving transistor, wherein a gate electrode of the driving transistor is electrically connected to the output terminal of the pulse amplitude modulation module, the output terminal of the width modulation module, and the first terminal of the storage module, and wherein one of a source electrode and a drain electrode of the driving transistor is electrically connected to the output terminal of the internal compensation module and the first terminal of the potential maintaining module, and wherein another one of the source electrode and the drain electrode of the driving transistor is electrically connected to the second terminal of the light-emitting control module; and wherein the control terminal of the driving module is the gate electrode of the driving transistor, and wherein the first terminal of the driving module is one of the source electrode and the drain electrode of the driving transistor, and wherein the second terminal of the driving module is another one of the source electrode and the drain electrode of the driving transistor.

15. The display panel according to claim 14, wherein the light-emitting control module comprises a light-emitting control transistor, and wherein one of a source electrode and a drain electrode of the light-emitting control transistor receives the positive power supply signal, and wherein another one of the source electrode and the drain electrode of the light-emitting control transistor is electrically connected to the another one of the source electrode and the drain electrode of the driving transistor, and wherein the gate electrode of the light-emitting control transistor receives the first control signal.

16. The display panel according to claim 14, wherein the pulse amplitude modulation module comprises a pulse amplitude control transistor, and wherein one of a source electrode and a drain electrode of the pulse amplitude control transistor receives a pulse amplitude data signal, and wherein a gate electrode of the pulse amplitude control transistor receives the second control signal, and wherein another one of the source electrode and the drain electrode of the pulse amplitude control transistor is electrically connected to the gate electrode of the driving transistor; and wherein the output terminal of the pulse amplitude modulation module is another one of the source electrode and the drain electrode of the pulse amplitude control transistor.

17. The display panel according to claim 16, wherein the pulse width modulation module comprises a pulse width control transistor, and wherein one of the source electrode and the drain electrode of the pulse width control transistor receives a pulse width data signal, and wherein a gate electrode of the pulse width control transistor receives the third control signal, and wherein another one of the source electrode and the drain electrode of the pulse width control transistor is electrically connected to the gate electrode of the driving transistor; and wherein the output terminal of the pulse width modulation module is the another one of the source electrode and the drain electrode of the pulse width control transistor.

18. The display panel according to claim 17, wherein the internal compensation module comprises a compensation transistor, and wherein one of a source electrode and a drain electrode of the compensation transistor receives the reset signal, and wherein a gate electrode of the compensation transistor receives a fourth control signal, and wherein another one of the source electrode and the drain electrode of the compensation transistor is electrically connected to one of the source electrode and the drain electrode of the driving transistor; and wherein the output terminal of the internal compensation module is another one of the source electrode and the drain electrode of the compensation transistor.

19. The display panel according to claim 18, wherein the electrical potential maintaining module comprises a first capacitor, and wherein a first terminal of the first capacitor is electrically connected to one of the source electrode and the drain electrode of the driving transistor, and wherein a second terminal of the first capacitor is electrically connected to the first terminal of the light-emitting control module and receives the positive power supply signal.

20. The display panel according to claim 10, wherein one frame time of the pixel circuit comprises a writing phase and a light-emitting phase, and wherein in the writing phase, the internal compensation module resets an electrical potential of the first terminal of the driving module, and then the pulse width modulation module writes a pulse width data signal to the control terminal of the driving module; and wherein in the light-emitting stage, the pulse width modulation module writes a pulse width data signal to the control terminal of the driving module to intermittently turn off the driving module.

* * * * *